US009114576B2

(12) United States Patent
Bolick et al.

(10) Patent No.: US 9,114,576 B2
(45) Date of Patent: Aug. 25, 2015

(54) HEAT VACUUM ASSISTED RESIN TRANSFER MOLDING PROCESSES FOR MANUFACTURING COMPOSITE MATERIALS

(75) Inventors: Ronnie L. Bolick, Trinity, NC (US); Ajit D. Kelkar, Greensboro, NC (US)

(73) Assignee: North Carolina Agricultural and Technical State University, Greensboro, NC (US)

( * ) Notice: Subject to any disclaimer, the term of this patent is extended or adjusted under 35 U.S.C. 154(b) by 878 days.

(21) Appl. No.: 12/361,224

(22) Filed: Jan. 28, 2009

(65) Prior Publication Data
US 2009/0189320 A1 Jul. 30, 2009

Related U.S. Application Data (60) Provisional application No. 61/023,920, filed on Jan. 28, 2008.

(51) Int. Cl.
*B29C 43/02* (2006.01)
*B29C 70/44* (2006.01)

(52) U.S. Cl.
CPC .................................. *B29C 70/443* (2013.01)

(58) Field of Classification Search
CPC ................................ B29C 45/02; B29C 70/48
USPC ................................................ 264/510, 511
See application file for complete search history.

(56) References Cited

U.S. PATENT DOCUMENTS

| 4,170,449 | A | * | 10/1979 | Shuman ........................ 425/445 |
| 4,902,215 | A | | 2/1990 | Seemann, III |
| 5,316,562 | A | | 5/1994 | Smithgall et al. |
| 6,143,219 | A | * | 11/2000 | Vidaurre et al. .............. 264/102 |
| 7,138,028 | B2 | | 11/2006 | Burpo et al. |
| 7,334,782 | B2 | | 2/2008 | Woods et al. |
| 7,413,694 | B2 | | 8/2008 | Waldrop, III et al. |
| 2002/0022422 | A1 | * | 2/2002 | Waldrop et al. ............... 442/179 |
| 2003/0132543 | A1 | * | 7/2003 | Gardner ........................ 264/85 |
| 2005/0086916 | A1 | * | 4/2005 | Caron ............................. 55/382 |

OTHER PUBLICATIONS

Chatterjee, A., et al., "Development of an Elevated Temperature Vacuum Assisted Resin Transfer Molding System for Thermoplastic Composites" 34th ISTC—Baltimore, MD—Nov. 4-7, 2002 (abstract only).
Johnson, R.J., Pitchumani, R., "Active Flow Control in a VARTM Process Using Localized Induction Heating" In: Proceedings of the FPMC7, Jul. 7-9, 2004, p. 247-52.
Bolick, R.L., Kelkar, A.D. Innovative Composite Processing by Using H-VARTM method Sampe Europe, Paris Apr. 2-4, 2007.

(Continued)

*Primary Examiner* — Christina Johnson
*Assistant Examiner* — Xue Liu
(74) *Attorney, Agent, or Firm* — Myers Bigel Sibley & Sajovec, P.A.

(57) ABSTRACT

The present invention provides a process for forming a composite material. The present invention further provides methods of improving the fiber volume fraction and/or the dimensional thickness of a composite panel.

18 Claims, 10 Drawing Sheets
(10 of 10 Drawing Sheet(s) Filed in Color)

(56) References Cited

OTHER PUBLICATIONS

Kelkar, A.D., Tate, J.S., Chaphalkar, P., "Performance evaluation of VARTM manufactured textile composites for the aerospace and defense applications" Materials Science and Engineering B 132 (2006) 126-128.

Cano, R., Grimsley, B., Jensen, B, Kellen, C. "High temperature VARTM with Larc polyimides," In: International SAMPE technical conference, 36th international SAMPE technical conference; 2004. p. 459-68.

Tate, J.S., Kelkar, A.D., Whitcomb, J.D., "Effect of braid angle on fatigue performance of biaxial braided composites" International Journal of Fatigue 28 (2006) 1239-1247.

Kelkar, A.D., Tate, J.S., Bolick, R., "Structural integrity of aerospace textile composites under fatigue loading" Materials Science and Engineering B 132 (2006) 79-84.

Wang, B., "Development of a High-Temperature Vacuum Assisted Resin Transfer Molding Testbed for Aerospace Grade Composites" Nov. 10, 2005 Report for Project No. # FA9550-04-1-0454.

* cited by examiner

HEAT VACUUM ASSISTED RESIN TRANSFER MOLDING PROCESSES FOR MANUFACTURING COMPOSITE MATERIALS

RELATED APPLICATION DATA

This application claims priority to and the benefit of U.S. patent application Ser. No. 61/023,920 filed Jan. 28, 2008, the disclosure of which is incorporated by reference herein in its entirety.

FIELD OF THE INVENTION

The present invention generally concerns methods of manufacturing composite materials using a process that presents an improvement over conventional vacuum assisted resin transfer molding processes.

BACKGROUND OF THE INVENTION

During the past decade, use of both carbon and fiberglass composites have dramatically increased for aerospace, marine and automotive applications. One of the drawbacks of using composites is the high manufacturing cost. Recently, several manufacturers have begun to employ a low cost vacuum assisted resin transfer molding (VARTM) process. However, one of the difficulties associated with the VARTM process is the lack in the number of resin systems suitable for ambient temperature VARTM processes. In particular, when higher glass transition temperatures are required (for example, as with most of the aerospace components), the conventional VARTM process is generally inadequate. Although it is possible to employ a conventional VARTM process inside an oven, such action places limitations on the size of the fabricated components.

Accordingly, there is a need in the field of composite manufacturing for a low-cost composite manufacturing approach that can be used to manufacture composites without infusing the resin into the composites in ovens or autoclaves at elevated temperatures and pressures or without the use of an oven-type heating mechanism.

BRIEF DESCRIPTION OF THE DRAWINGS

The present application contains at least one drawing executed in color. Copies of this patent application publication with color drawings will be provided by the United States Patent and Trademark Office upon request and payment of the necessary fee.

SUMMARY OF THE INVENTION

Embodiments of the present invention provide processes for forming a composite material using a resin infusion process, the improvement including subjecting a majority of the components of a resin infusion process to an increased temperature, wherein the temperature is stabilized and maintained for a predetermined time prior to introducing a resin into the resin infusion system. In some embodiments, the entire resin infusion system such as a VARTM (Vacuum Assisted Resin Transfer Molding) system is subjected to an increased temperature. In other embodiments, the process can be employed to form complex-shaped composites.

Embodiments of the present invention further provide methods for improving the fiber volume fraction and/or the dimensional thickness of a composite panel, the method including forming a composite using a process similar to the vacuum assisted resin transfer molding (VARTM) process and subjecting a majority of the components of the VARTM system to an increased temperature, wherein the temperature is stabilized and maintained for a predetermined time prior to introducing a resin into the reinforcement fabric material. In some embodiments, the entire VARTM system is subjected to an increased temperature. In other embodiments, the process can be employed to form a complex-shaped composite.

Aspects of the present invention provide a more reliable and/or cost-effective, as well as manufacturing-user friendly process for manufacturing composite materials. Such advantages have utility for various applications, for example, aerospace, marine, automotive engineering, Military and Alternative Energy system applications.

DETAILED DESCRIPTION

The foregoing and other aspects of the present invention will now be described in more detail with respect to other embodiments described herein. It should be appreciated that the invention can be embodied in different forms and should not be construed as limited to the embodiments set forth herein. Rather, these embodiments are provided so that this disclosure will be thorough and complete, and will fully convey the scope of the invention to those skilled in the art.

The terminology used in the description of the invention herein is for the purpose of describing particular embodiments only and is not intended to be limiting of the invention. As used in the description of the embodiments of the invention and the appended claims, the singular forms "a," "an" and "the" are intended to include the plural forms as well, unless the context clearly indicates otherwise. As used herein, the term "and/or" includes any and all combinations of one or more of the associated listed items. Further, it will be understood that steps comprising the methods provided herein can be performed independently or at least two steps can be combined when the desired outcome can be obtained.

Unless otherwise defined, all technical and scientific terms used herein have the same meaning as commonly understood by one of ordinary skill in the art to which this invention belongs.

As used herein, "composite" or "composite material" refers to a combination of two or more materials. The materials generally possess different physical or chemical properties that remain separate and distinct on a macroscopic level within the finished product. For example, a fabric may be considered one material and a resin another material. The fiber reinforcements of the fabric in a composite can provide mechanical properties such as stiffness, tension and impact strength. The resin material can provide physical characteristics such as resistance to fire, weather, ultraviolet light and chemicals.

As used herein, "glass transition temperature" or "$T_g$" refers to the temperature at which an amorphous polymer undergoes a non-reversible change from a viscous or rubbery material to a hard or brittle material or vice versa.

As used herein, "resin infusion process" refers to a process in which a resin enters or is infused into the reinforcement or fabric of the composite material.

Figure 1:
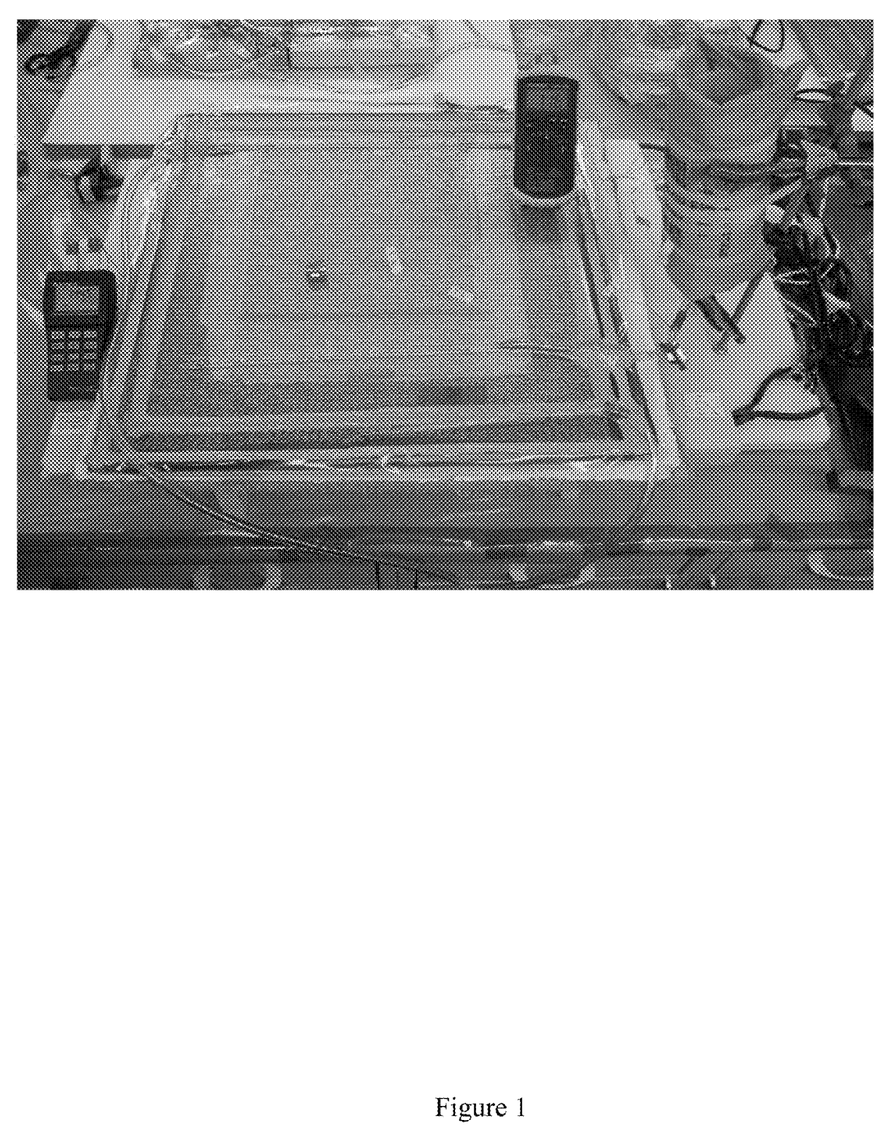
FIG. 1 presents an exemplary H-VARTM system setup.

As used herein, "vacuum assisted resin transfer molding (VARTM) system" refers to the materials, apparatus and/or equipment used to conduct a VARTM process, including a mold, peel ply, resin flask, sealing tape, flow media, tubing and bagging materials. FIG. 1 presents an exemplary H-VARTM system. It should be noted that VARTM is a variation of the Seemann Composite Resin Infusion Process (SCRIMP) (See U.S. Pat. Nos. 5,316,562 and 4,902,215. Generally, the SCRIMP process introduces liquid resin from an external source into the fabric by a resin inlet port. The resin flow is through the thickness of the fabric by the use of a resin distribution medium. This medium allows a resin to flow quickly over the surface area as it infuses the thickness of the fabric or preform). During VARTM, dry fabric is placed onto a mold and vacuum bagged simultaneously with a resin distribution line, a vacuum line and distribution media. A low viscosity resin is drawn into and through the fabric via a vacuum line. The resin distribution media allows the resin to completely infiltrate through the thickness of the fabric or completely wet through the fabric. This process may eliminate a noticeable amount of the voids or dry spots of the composite panel.

Embodiments of the present invention provide a process for forming a composite material using a vacuum assisted resin transfer molding process, the improvement including subjecting a majority of the components of a VARTM system to an increased temperature, wherein said temperature is stabilized and maintained for a predetermined time prior to introducing a resin into the VARTM system. Accordingly, the improved process can be referred to as heated vacuum assisted resin transfer molding or H-VARTM. The H-VARTM process described above can be used to improve the fiber volume fraction and/or the dimensional thickness quality/stability of a composite. This process has been adapted from use on flat composite plates/panels to the manufacture of complex shaped composite parts. Marine and aerospace resin systems such as Epon and vinyl esters have been infused using the H-VARTM procedure. Reinforcement materials such as fiberglass, carbon and Barotex fabrics have been used to manufacture composites. Satin, crow, stitch bonded, woven roven and basket weaves have been used in the process with excellent results. In particular, the viscosity of aerospace resin systems at room temperature generally produces low quality composites or composites with low fiber volume fractions, resulting in a reduced strength composite. Thus, the temperature at which the VARTM system is maintained was increased to achieve an improved flow of the resin through the selected material, thus improving the saturation or coating of the fibers. The increased temperature can be in a range between 100° F. up to 550° F. In some embodiments, the temperature is in a range of between about 200° F. and 550° F. The temperature is maintained consistently across the composite panel and thus, the temperature gradient between the bottom of the glass at the outermost bag to the top outermost bag of the system is minimized. Even heating was shown to allow even coating and distribution of the resin in the composite materials. Thermocouple probes are located at various locations on the insulating material, including on the bottom of the glass, and at several locations spaced on the bag over the fabric and on the resin flask and input tubing of the system. Once the temperature has stabilized (within +/−1 to 5° F.), the temperature over the panel is maintained consistently for at least 20 minutes, the panel can then be infused with resin. Each laboratory should be aware of several parameters upon starting this procedure. In particular, the ambient temperature in the laboratory should be measured and maintained. The composite size is dependent upon the size of the mold being used.) For example, a panel size of 14"×14" can fit onto a 24"×24"×½" tempered glass mold. The processing and manufacturing materials being used for H-VARTM should be able to withstand approximately the post cure temperature of the resin. These materials can include Mylar, peel ply, bagging, sealing tape such as mastic, resin distribution media and tubing (both vacuum and spiral). A heating pad with a temperature control or other suitable apparatus with a temperature control mechanism can be used to cover the entire glass mold. A piece of fiberglass insulation can be placed between the tabletop and the heating mechanism. For added insulation, an insulating material such as a piece of extruded polystyrene (EPS) foam can be placed on top of the fiberglass insulation. The controlled heating mechanism can ensure that the heating loss and gradient is minimized. A controller that can sense different temperatures over the panel should be used. Thus, a separate digital thermocouple system can be used to monitor the various temperatures in the setup. A minimum of six probes can be placed throughout the setup. In some embodiments, a variable temperature controller can be used with a heating blanket in order to control the temperature of the setup.

A test run can be performed to ensure all the temperatures are within tolerance. It is recommended that the knob setting of the temperature apparatus be documented for future reference. By adjusting the controller, the temperature variations may inform the user of the heating system's response to the fluctuations in the temperature of the mold.

Embodiments of the present invention will be further explained with reference to the following example, which is included herein for illustration purposes only, and which is not intended to be limiting of the invention.

EXAMPLE

A. Resin Selection

The selection of resin is dictated by the end use of the composite. It can be influenced by factors such as mechanical properties, environmental resistance, cost and manufacturability. Accordingly, the properties desired in the final composite should be considered. The most common resins for aerospace applications are thermoset resins, such as esters and epoxies. Some of the most common epoxies used are tetraglycidyl methylene dianiline (TGMDA) and diglycidyl ether of biphenol A (DGEBA).

The most common resins for aerospace applications are thermoset resins, such as esters and epoxies. Thermoset resins polymerize to a permanently solid and infusible state upon the application of heat. Once the thermoset resin has hardened, it cannot be reliquidified without damaging the material. Thermoset resins have excellent adhesion, high thermal stability, high chemical resistance and less creep than thermoplastics. Since their viscosity is low, the fabric can be completely wetted prior to the end of the gel time. Vinyl ester resins have a higher failure strain than polyester resins. This characteristic improves the mechanical properties, the impact resistance and the fatigue performance. The formulation process for vinyl esters is complex. The procedure consists of weighing out and mixing a promoter, a catalyst and a retarder by specific percentages to the resin weight. The promoter expedites the curing process. The catalyst promotes or controls the curing rate of the resin and the retarder absorbs any free radicals remaining once the exothermic reaction begins. As stated previously, the thermoset resin cures when heat is applied. The heat is generated by the interaction of the resin with the catalyst. The other two components control the rate of cure. Most vinyl esters cure at ambient room temperature. Thermoplastic resins flow when subjected to heat and pressure, and then solidify on cooling without undergoing cross-linking. Thermoplastic resins can be reliquidified since the material does not cross-link.

Polymerization is the chemical reaction in which one or more small molecules combine to form a more complex chemical, with a higher molecular weight. Typical examples are polyethylene, nylon, rayon, acrylics and PVC (polyvinyl chloride). Cross-linking is the joining or intermingling of the ends of the chemical bonds that make the material stronger and harder to pull apart, thus providing good mechanical properties.

Vinyl ester resins (or esters generally) may be chemically similar to both unsaturated polyesters and epoxy resins. They were developed as a compromise between the two materials, providing the simplicity and low cost of polyesters and the thermal and mechanical properties of epoxies. Vinyl esters can also be used in wet lay-ups and liquid molding processes such as RTM. Unsaturated polyester resins are Alkyd thermosetting resins characterized by vinyl unsaturation in the polyester backbone. The definition of unsaturation is any chemical compound with more than one bond between adjacent atoms, usually carbon, and thus reactive toward the addition of other atoms at that point. Alkyd resins are polyesters derived from a suitable dibasic acid and a polyfunctional alcohol. A dibasic acid is an acid that contains two hydrogen atoms capable of replacement by basic atoms or radicals. A radical is either an atom or molecule with at least one unpaired electron, or a group of atoms, charged or uncharged, that act as a single entity in the reaction. Carboxyl groups also react with amine groups to form peptide bonds and with alcohols to form esters. Condensation polymerization occurs when monomers bond together through condensation reactions. Typically, these reactions are achieved through reacting molecules that incorporate alcohol, amine or carboxylic acid (also known as organic acid) functional groups. These unsaturated polyesters are most widely used in reinforced plastics.

Epoxy resins are a family of thermosetting resins generally formed from low molecular weight diglycidyl ethers of bisphenol A. Depending on the molecular weight, the resins range from liquids to solids and can be cured with amines, polyamides, anhydrides or other catalysts. Epoxy resins are also widely used in reinforced plastics because they have good adhesion to fibers. In addition, their low viscosities are effective in wetting various reinforcing materials. In the aerospace market, the most widely used resins are epoxy resins. They have a high curing temperature of around 350° F. (177° C.), which places their $T_g$ at 302° F. (150° C.). $T_g$ is the glass transition temperature. No other resin on the market can contend with this high $T_g$ epoxies have high fracture toughness, which make their fatigue performance superior to vinyl esters. They also have a low cure shrinkage rate compared to vinyl esters, so there is less possibility of cracking or crazing during the cure of components. The formulation of epoxies is also simple; it consists of two parts, the epoxy and the curing agent. The ratio of these two components provides the rate at which the mixture cures. The epoxy determines the mechanical properties and the curing agent determines the cure temperature. Some of the most common epoxies used are TGMDA (tetraglycidyl methylene dianiline) and DGEBA (diglycidyl ether of biphenol A). The TGMDA epoxy has higher mechanical properties and higher $T_g$ than the DGEBA epoxy. The DGEBA epoxy has a higher failure strain and lower water absorption than the TGMDA epoxy.

By definition, a composite is a combination of two or more materials. The fabric is considered the first material and the resin the second material. The fiber reinforcements in the composite provide mechanical properties such as stiffness, tension and impact strength. The resin matrix provides physical characteristics such as resistance to fire, weather, ultraviolet light and chemicals. When the total system of the composite is subjected to loading, the fabric, individual fiber or tows carry the majority of the load. The selection of the resin is critical due to the interconnection of the fiber and the resin. The type of resin determines the manufacturing process, environmental temperature, and the corrosion resistance of the final composite. In the production of aircraft, high glass transition temperature ($T_g$), high damage tolerance, high impact resistance and high fatigue life are the important factors in determining the materials to be used. The glass transition temperature is the temperature at which an amorphous polymer undergoes a non-reversible change from a viscous or rubbery material to a hard or brittle material or vice versa. Therefore, the $T_g$ provides a limit for the upper case service conditions. Glass transition temperature is called by several names, for instance, ASTM D648 terms it "heat distortion temperature". The gel time of the resin is another factor that is used in the selection of the resin. Gel time is the time from the initial mixing of the resin with its curing agent to the point where the viscosity of the mixture increases to a point where the flow of the resin through the fabric ceases. Manufacturers suggest that the gel time is the time that it takes to double the resin's starting viscosity value.

Suitable resins include those having suitable characteristics to DM 411-350 vinyl ester manufactured by the Dow Chemical Company, Inc. and EPON® Resin Systems manufactured by Resolution Performance Products, Inc such as Epon 9504, Epon 862 and Epon 826. Both resins types have high $T_g$'s. DM411-350 is used in adverse chemical environments, and its applications include chemical processing, pulpwood and paper processing. It is used in the food and beverage industry, but it is not currently being used in aerospace applications. EPON® resins have high tensile strength and elongation properties, which are important in composite applications. EPON® resins are a two-part system. The second part is EPI-Cure® Curing Agent. The EPON® resins have viscosities that work will between the 100 to 350 degree F. range and are easy to mix and work with in the manufacture of composites.

B. Apparatus

The materials, apparatus, and/or equipment can include the mold, peel ply, resin flask, sealing tape such as mastic, flow media and tubing and bagging materials. These materials are readily available.

Standard molds such as Formica® countertops, polycarbonate or Lexan® generally do not perform well at temperatures above 121° C. (250° F.). Accordingly a new mold was designed from tempered glass. The glass mold surface is smooth and flat and does not warp or delaminate with increased temperature and further provides a desirable surface for adherence of mastic for vacuum of the panel. To ensure low viscosity of the resin throughout the flow process, a heating pad of the size of the glass mold and a controller were placed under the mold, and insulation was further placed beneath the heating pad to reflect the heat into the fabric. Thermocouples were used to monitor the heat under and across the setup mold and on the resin input tube. A heating pad was wrapped around the resin flask to maintain the temperature of the resin during infusion. FIG. 1 illustrates the completed setup. The heating pad can be used to cure the composite without an oven by covering the setup with an insulative cover during the post-flow cycle for the manufacturer's suggested cure period. The panel can also be placed into an oven for curing, if desired.

C. Process

The temperature of the entire VARTM system was increased to achieve the best flow of the resin through the material. Once the temperature for the correct viscosity was determined, this temperature was made consistent across the panel. The gradient between the bottom of the glass to the outermost bag on the top was minimized. This even heating allowed even coating and distribution of the resin. Multiple thermocouple probes were located at various locations on the insulating material, also on the bottom of the glass, and at several locations spaced on the bag over the fabric and on the resin flask and input tubing. Once the temperature was stabilized (within +/−17.2° C. (1° F.)) and the temperature over the panel was maintained consistently for about 20 minutes, the panel was flown with resin.

Figure 2:
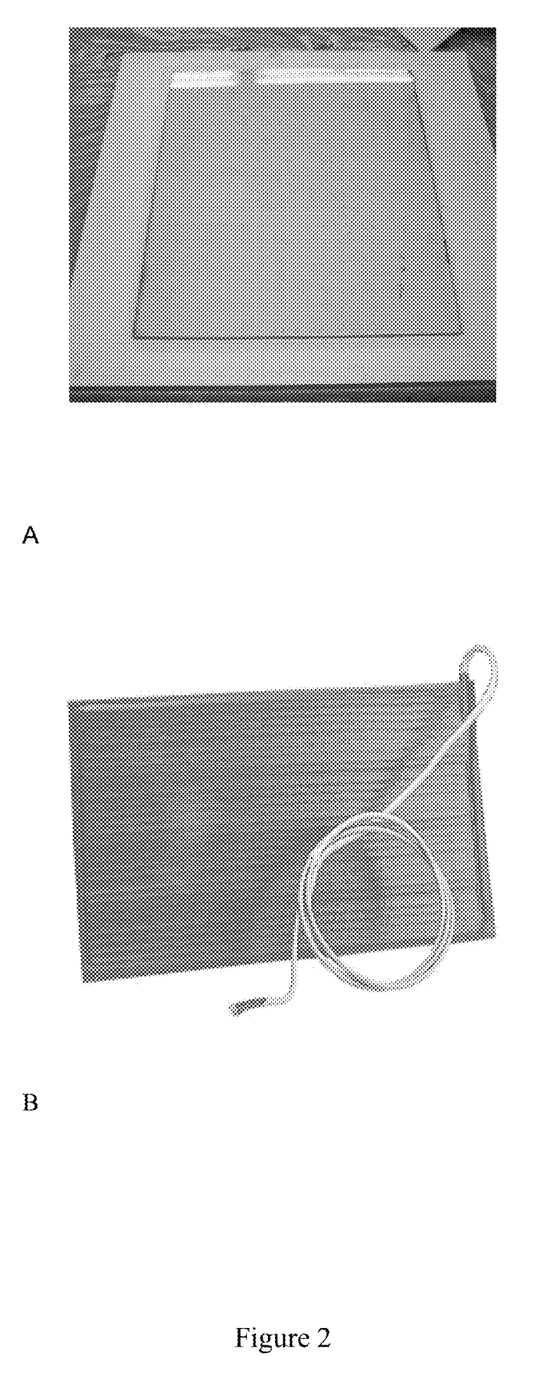
FIG. 2 presents an exemplary glass mold and heating pad in the H-VARTM system setup.

Each laboratory should be aware of several parameters upon starting this procedure. First, the ambient temperature in the laboratory should be measured and maintained. The panel size should also be taken into account, if post-curing in an oven is desired. The entire panel must fit into the oven for post cure. The materials used for H-VARTM should be able to withstand the range of temperatures used to cure the resin. A piece of fiberglass insulation was placed between the tabletop and a heating pad. For added insulation, a piece of extruded polystyrene (EPS) foam was purchased at a local hardware store and the fiberglass insulation was placed on top. A thermocouple controller is not recommended, as this type of controller does not consider the different temperatures over the panel. A separate digital thermocouple system was used to monitor the various temperatures in the setup. A minimum of six thermocouple probes was placed throughout the setup. A variable temperature controller was used with the heating blanket in order to control the temperature of the setup. FIG. 2 illustrates the glass mold and the heating pad.

A test was performed to ensure that all the temperatures are within tolerance. By adjusting the controller, the temperature variations indicate to the user how the heating system responds to the fluctuations in the temperature of the mold. This location was marked on the controller face and then turned off and the system was subsequently allowed to cool down to ambient temperature. The entire process was repeated until the set point was accurately determined.

Figure 3:
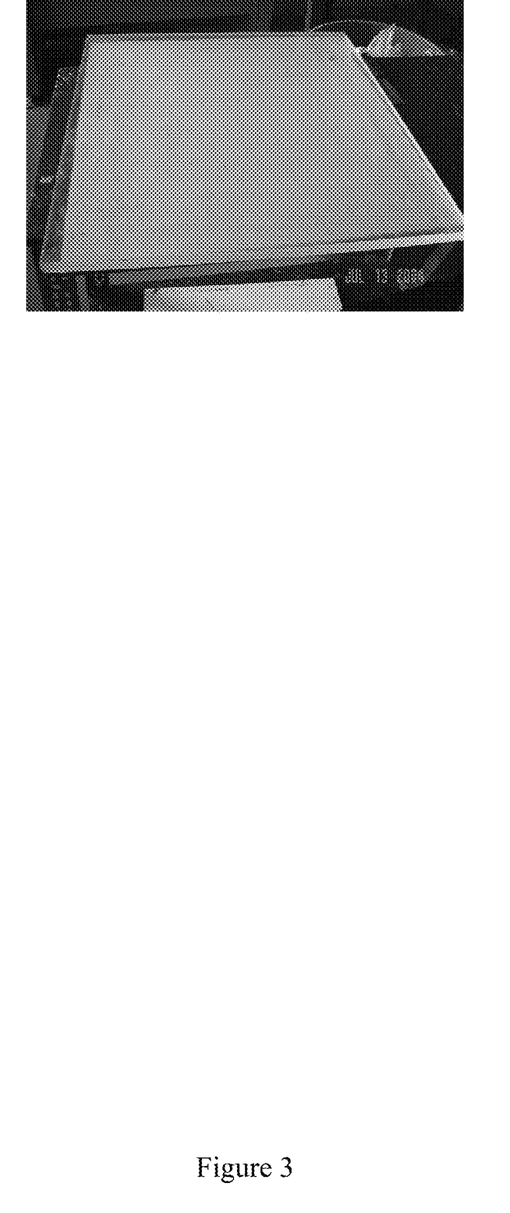
FIG. 3 presents an exemplary setup showing a piece of Mylar that was cut and placed on the glass mold.
Figure 4:
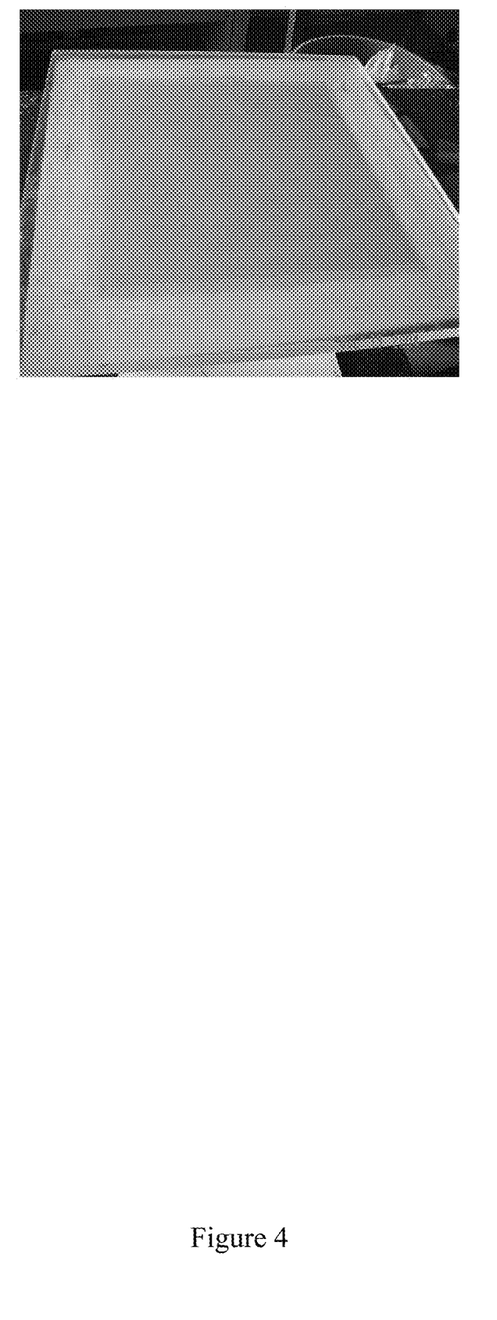
FIG. 4 presents an exemplary setup of the Mylar of FIG. 3 centered on the setup.
Figure 5:
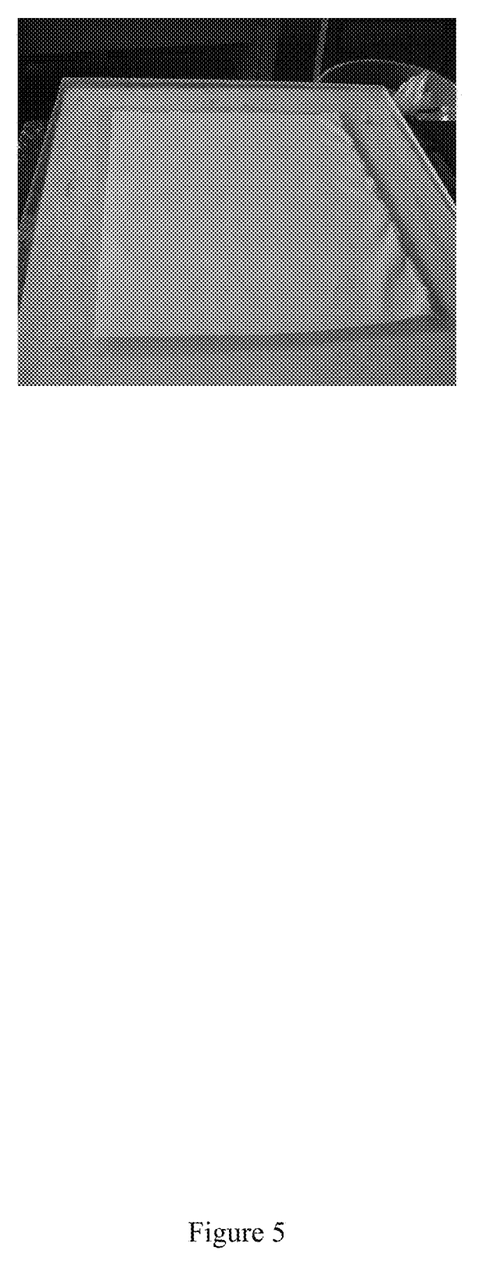
FIG. 5 presents an exemplary setup showing a piece of peel ply that has been cut and centered onto the Mylar.
Figure 6:
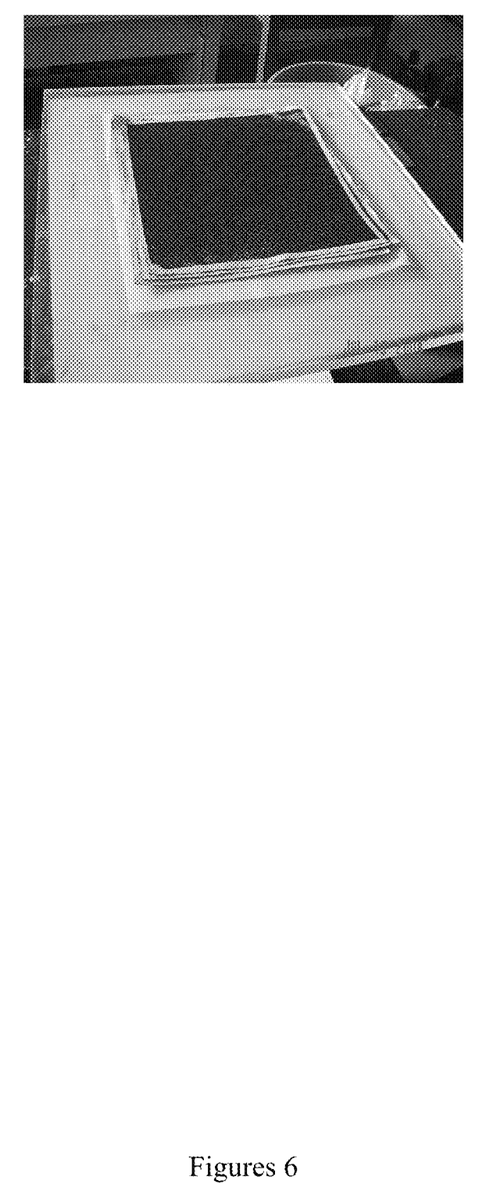
FIG. 6 presents an exemplary setup where the plies of fabric have been cut and aligned onto the peel ply.
Figure 7:
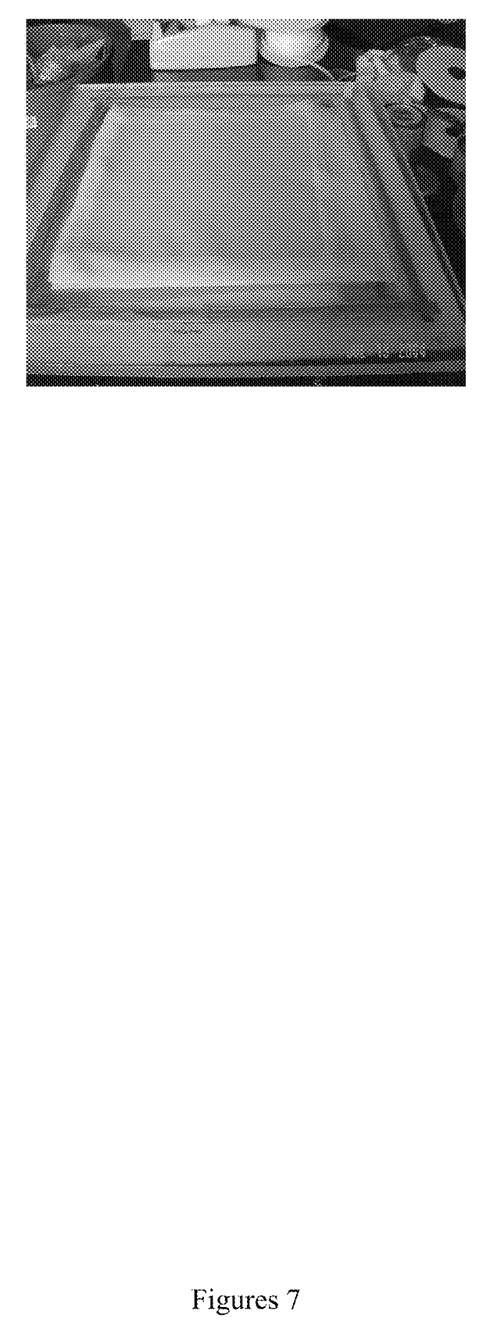
FIG. 7 presents an exemplary setup showing resin distribution media cut and placed onto the peel ply.
Figure 8:
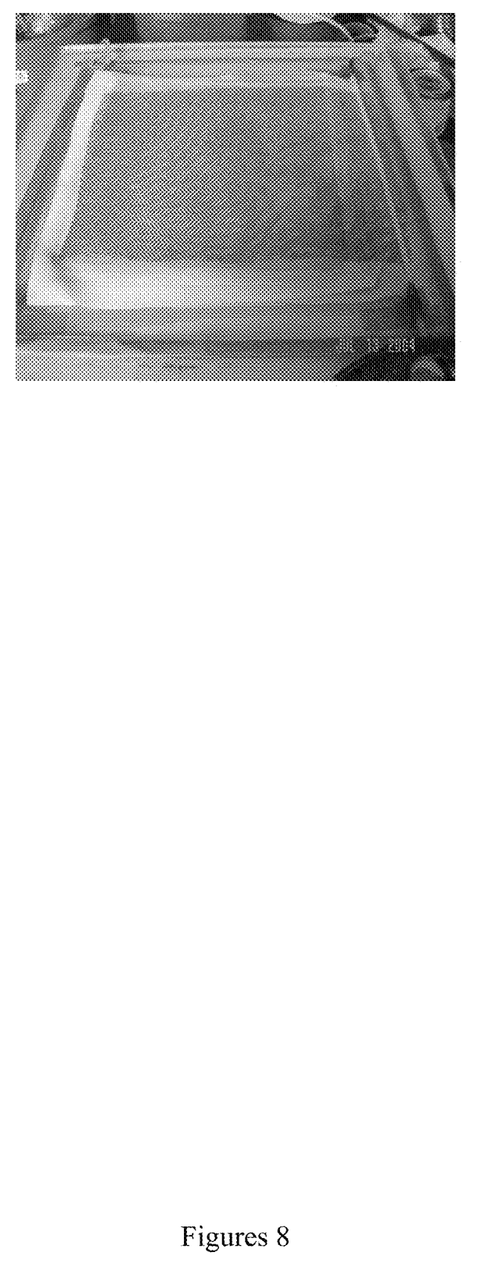
FIG. 8 presents an exemplary setup showing resin distribution media placed under the spiral tubing and extended to the opposite end and stopped a half inch from the vacuum line located between the peel plies.

Once the two pieces of insulating material were laid onto the table and the heating pad was placed on top of the materials, the glass mold was positioned on top of the heating pad. The thermocouple probe was placed on the EPS insulation and one on the bottom of the glass mold in the center. Referring to FIG. 3, a piece of Mylar was cut and placed on the glass mold and centered as shown in FIG. 4. As shown in FIG. 5, a piece of peel ply was cut and centered onto the Mylar. The plies of fabric were cut and aligned onto the peel ply as shown in FIG. 6. The fabric was adjusted accordingly with half an inch left between the fabric and the edge of the peel ply and approximately 4 inches on the other end. Another piece of peel ply was cut to the same size as the previous peel ply and aligned with the bottom piece. The vacuum and resin input lines were placed by cutting a piece of spiral tubing and a piece of PVC vacuum line and inserting approximately 7 inches of spiral line into the vacuum line. A piece of mastic sealant tape was taped around the intersection of the two in order to hold the spiral tubing in place. Another piece of sealant tape was used tape off the end of the spiral tubing. This section of connected spiral and vacuum tubing was placed and taped to the Mylar after sliding the spiral tubing into the half-inch section remaining as mentioned above. The spiral tubing was adjusted so that the taped edge extended approximately 2 inches from the peel ply. The spiral tubing on the opposite end was gripped at the intersection and gently pulled and taped onto the Mylar. This process of making a spiral and vacuum tubing setup was repeated. A second piece of tubing was placed on the other end of the setup approximately 3½ to 4 inches from the fabric and taped to the Mylar in the same manner as discussed above. On this end, the peel ply was placed under the spiral tubing. A piece of resin distribution media was cut and placed onto the peel ply in the manner as shown in FIG. 7. The resin distribution media was adjusted to leave half an inch from either side of the fabric length under the peel ply. The resin distribution media was also placed under the spiral tubing and extended to the opposite end and stopped a half inch from the vacuum line located between the peel plies as shown in FIG. 8.

Figure 9:
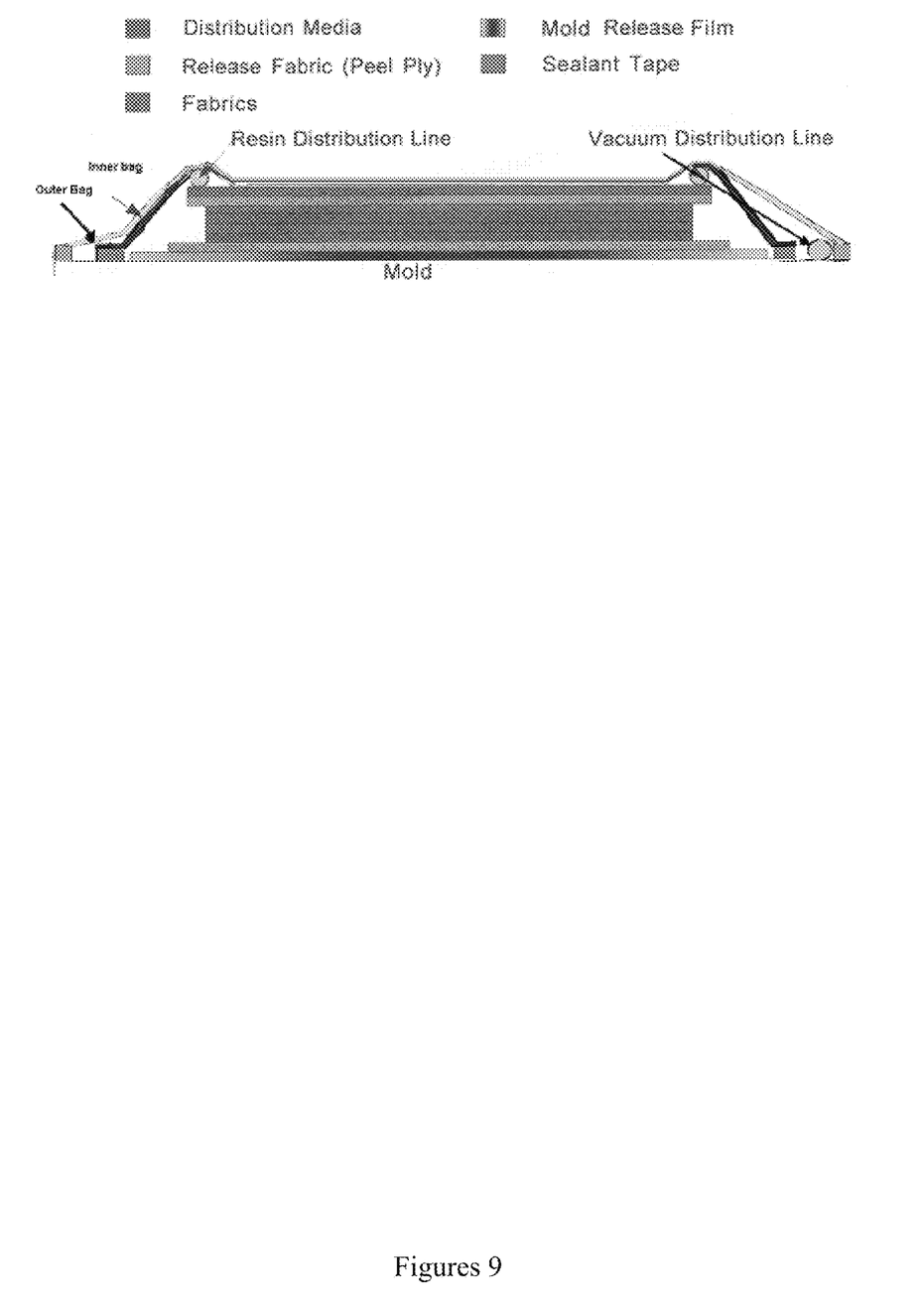
FIG. 9 presents an exemplary setup showing a cross-sectional view of the H-VARTM setup.

Mastic was placed around the edge of the Mylar and the vacuum tubing was sealed into the mastic. Bagging material was cut approximately 1" larger than the mastic and pressed onto the mastic and the material was sealed. Mastic was placed around the first bag and a second bag was cut and sealed onto the mastic. A complete setup is illustrated in FIG. 1. The inner bag had a vacuum applied and was allowed to stabilize. A vacuum gauge was used to measure the vacuum. Once the inner bag was tested and passed, vacuum was applied to the outer bag and tested. The vacuum was applied for approximately 5 hours to remove any trapped air. A cross-sectional view of the setup is shown in FIG. 9.

Figure 10:
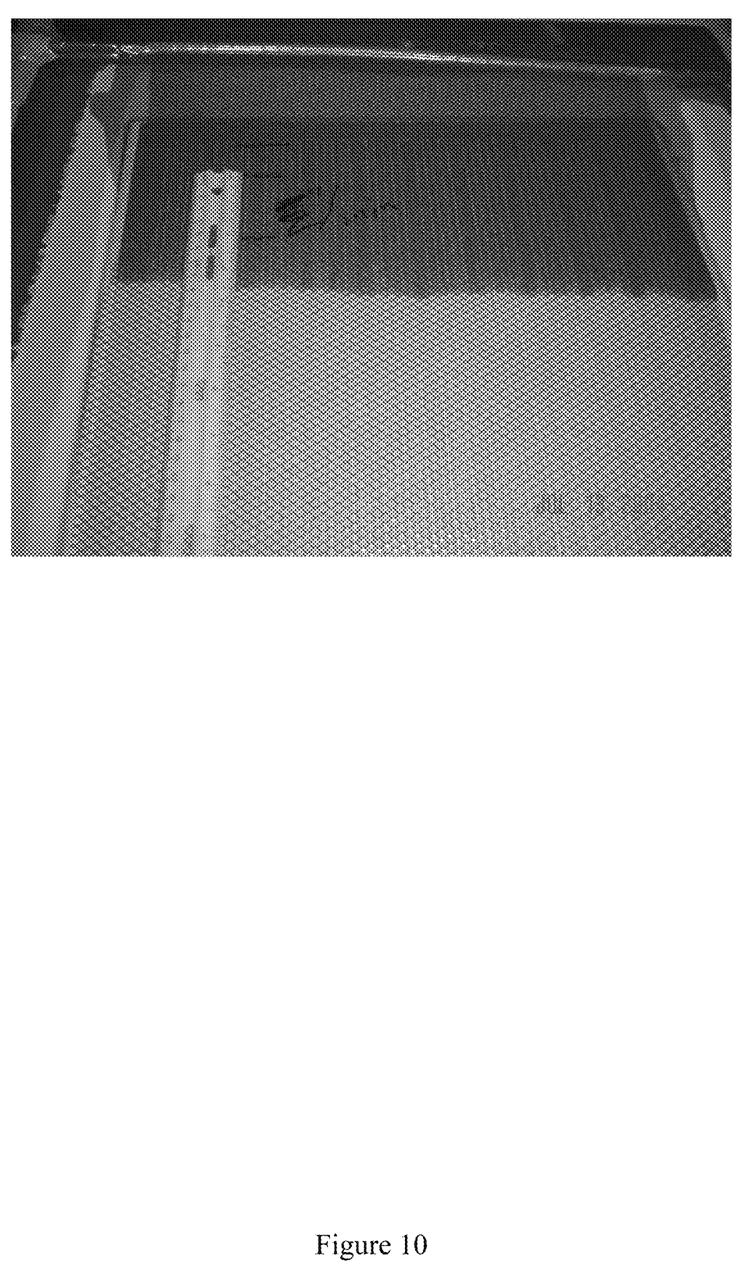
FIG. 10 illustrates the resin flow during the H-VARTM process.

After completing the setup, the setup was placed on the heating pad and insulation. The thermocouple probes were applied in various locations over the fabric panel and on the resin input line and resin flask. A standard heating pad was placed around the resin flask to maintain the resin temperature in the flask during flow of the resin. Once the temperature was stabilized, the panel was flown. Specifically, the resin and catalyst were mixed, stirred and degassed for 10 minutes. The resin was placed into an oven and adjusted to the determined temperature, which was maintained for approximately 20 minutes. A locking jaw was placed onto the input line between the flask and the panel in order to control the flow rate of the resin through the panel. The resin was then poured into the resin flask and the cover was placed on top. The locking jaw was opened slowly and the resin was allowed to flow into the fabric. The flow rate was adjusted between ¼" and half an inch per minute. The flow rate was measured by placing marks on the panel once the resin entered the fabric and extended across the entire width as shown in FIG. 10. The flow was measured for approximately one minute. As the resin began to back up in the vacuum line and air bubbles began to decrease, the vacuum line was clamped. The temperature controller was turned off and the panel temperatures were allowed to drop, thereby changing the viscosity. All tubing was clamped and the glass mold was placed onto a shelf in the oven and the post-cure process was initiated.

D. Test Results

Measurements of the fiber volume fraction ($V_f$) taken on the specimens cut from each composite panel using the H-VARTM process described above illustrate that higher volume fractions can be achieved in comparison to that obtained using a conventional VARTM process or a resin transfer molding (RTM) process. The fiber volume fraction increased by approximately 20% using the HVARTM process compared to the VARTM, conventional VARTM volume fractions range between 40 to 50%, where HVARTM volumes range from 50 to 59%. Table 1 illustrates the fiber volume fraction values of two panels measured using the VARTM and H-VARTM processes.

Variations in thickness were also reduced across the composite panels. Tables 2 and 3 illustrate the decreased thickness variations. 70 panels were manufactured and measured for fiber volume fraction and thickness.

TABLE 1

Comparison of Fiber Volume Fractions from Two Different Manufacturing Processes

| Specimen | VARTM Fiber Volume Fraction % | HVARTM Fiber Volume Fraction % |
|---|---|---|
| 1.00 | 44 | 59 |
| 2.00 | 44 | 56 |
| 3.00 | 44 | 56 |
| 4.00 | 43 | 56 |
| 5.00 | 46 | 56 |
| 6.00 | 45 | 56 |
| 7.00 | 46 | 56 |
| 8.00 | 47 | 56 |
| 9.00 | 39 | 56 |
| 10.00 | 38 | 56 |
| 11.00 | 41 | 56 |
| 12.00 | 41 | 56 |
| 13.00 | 49 | 56 |
| 14.00 | 49 | 56 |
| 15.00 | 47 | 56 |
| 16.00 | 48 | 56 |

TABLE 2

Thickness variation in panel 1 (in inches).

| | X1 | X2 | X3 | X4 | X5 | X6 | X7 | X8 | X9 | X10 |
|---|---|---|---|---|---|---|---|---|---|---|
| Resin Flow | 0.096 | 0.097 | 0.095 | 0.098 | 0.098 | 0.099 | 0.095 | 0.095 | 0.094 | 0.092 |
| | 0.095 | 0.097 | 0.098 | 0.097 | 0.099 | 0.097 | 0.099 | 0.099 | 0.100 | 0.097 |
| | 0.099 | 0.097 | 0.095 | 0.098 | 0.096 | 0.094 | 0.096 | 0.095 | 0.094 | 0.094 |
| | 0.099 | 0.097 | 0.096 | 0.097 | 0.098 | 0.094 | 0.097 | 0.097 | 0.096 | 0.095 |
| Maximum Thickness Variation | 0.004 | 0.000 | 0.003 | 0.001 | 0.003 | 0.005 | 0.004 | 0.004 | 0.006 | 0.005 |

TABLE 3

Thickness variations in panel 2 (in inches).

| | C1 | C2 | C3 | C4 | C5 | C6 | C7 | C8 | C9 | C10 |
|---|---|---|---|---|---|---|---|---|---|---|
| Resin Flow | 0.099 | 0.090 | 0.090 | 0.093 | 0.095 | 0.090 | 0.092 | 0.090 | 0.092 | 0.092 |
| | 0.091 | 0.091 | 0.090 | 0.091 | 0.092 | 0.090 | 0.089 | 0.087 | 0.089 | 0.089 |
| | 0.091 | 0.090 | 0.089 | 0.091 | 0.090 | 0.092 | 0.087 | 0.087 | 0.086 | 0.086 |
| | 0.090 | 0.090 | 0.092 | 0.093 | 0.090 | 0.091 | 0.093 | 0.089 | 0.087 | 0.086 |
| Maximum Thickness Variation | 0.009 | 0.001 | 0.007 | 0.002 | 0.003 | 0.002 | 0.006 | 0.003 | 0.006 | 0.006 |

The H-VARTM process described herein manufactured composite panels using resins at room temperature with consistent results that improved the fiber volume fraction and reduced variation in thickness across the composite. The H-VARTM process provides a low cost process for the manufacture of simple and complex composite components.

The foregoing is illustrative of the present invention, and is not to be construed as limiting thereof. The invention is defined by the following claims, with equivalents of the claims to be included therein.

That which is claimed is:

1. A process for forming a complex-shaped composite material using a vacuum assisted resin transfer molding (VARTM) system, the process comprising:
   introducing a fabric into the VARTM system comprising a plurality of components, the plurality of components comprising at least two components selected from the group consisting of a mold, a peel ply, a resin flask, sealing tape, a flow media, tubing, and bagging material;
   heating a majority of the components of the VARTM system to an increased temperature using a heating source, wherein the heating source is not an autoclave or an oven;
   introducing a thermoset resin into the VARTM system; and
   infusing the thermoset resin into the fabric, wherein the increased temperature of the majority of the components of the VARTM system is maintained by the heating source throughout the infusing the thermoset resin into the fabric,
   wherein the process produces the complex-shaped composite material having a fiber volume fraction of at least 56%.

2. The process of claim 1, wherein the increased temperature is in the range of about 100° to 550° F.

3. The process of claim 1, wherein the increased temperature is in the range of about 200° to 550° F.

4. The process of claim 1, wherein the increased temperature of the majority of the components of the VARTM system is stabilized for at least about 20 minutes immediately prior to infusing the thermoset resin into the fabric.

5. The process of claim 2, wherein the thermoset resin is infused into the fabric at a temperature that varies no more than ±5° F. from the increased temperature.

6. The process of claim 5, wherein the thermoset resin is infused into the fabric at a temperature that varies no more than ±1° F. from the increased temperature.

7. The process of claim 1, wherein the composite material has a fiber volume fraction of at least 59%.

8. The process of claim 1, wherein the thermoset resin is selected from the group consisting of a vinyl ester resin and an epoxy resin.

9. The process of claim 1, wherein the heating source is a heating blanket or heating pad.

10. The process of claim 1, wherein two or more thermocouples are applied to various locations on the VARTM system and are used to monitor temperatures at the various locations.

11. The process of claim 1, wherein the heating source is a heating blanket or heating pad operatively coupled to a variable temperature controller.

12. The process of claim 1, wherein the majority of the components of the VARTM system comprises the mold, the fabric, and the bagging material.

13. The process of claim 12, wherein the mold comprises tempered glass.

14. The process of claim 10,
wherein a first thermocouple of the two or more thermocouples is applied to a mold of the VARTM system,
wherein a second thermocouple of the two or more thermocouples is applied to a resin input tube of the VARTM system, and
wherein the first and second thermocouples are used to monitor temperatures at the mold and the resin input tube, respectively.

15. The process of claim 10, wherein the two or more thermocouples comprises at least six thermocouples.

16. A process for forming a complex-shaped composite material using a vacuum assisted resin transfer molding (VARTM) system, the process comprising:
introducing a fabric into the VARTM system comprising a plurality of components, the plurality of components comprising at least two components selected from the group consisting of a mold, a peel ply, a resin flask, sealing tape, a flow media, tubing, and bagging material;
heating a majority of the components of the VARTM system to an increased temperature using a heating source, the heating source comprising at least one of a heating blanket or a heating pad;
introducing a thermoset resin into the VARTM system; and
infusing the thermoset resin into the fabric,
wherein the increased temperature of the majority of the components of the VARTM system is stabilized for at least about 20 minutes immediately prior to infusing the thermoset resin into the fabric,
wherein the increased temperature is maintained within ±5° F. by the heating source throughout the infusing the thermoset resin into the fabric, and
wherein the process produces the complex-shaped composite material having a fiber volume fraction of at least 56%.

17. The process of claim 16, wherein increased temperature is maintained within ±1° F. by the heating source throughout the infusing the thermoset resin into the fabric.

18. The process of claim 16, wherein the majority of the components of the VARTM system comprises the mold, the fabric, and the bagging material.

* * * * *

UNITED STATES PATENT AND TRADEMARK OFFICE
CERTIFICATE OF CORRECTION

PATENT NO. : 9,114,576 B2  
APPLICATION NO. : 12/361224  
DATED : August 25, 2015  
INVENTOR(S) : Bolick et al.

Page 1 of 1

It is certified that error appears in the above-identified patent and that said Letters Patent is hereby corrected as shown below:

In the Claims:

Column 10, Claim 4, Line 38: Please correct "about 20minutes" to read -- about 20 minutes --

Column 12, Claim 16, Line 17: Please correct "about 20minutes" to read -- about 20 minutes --

Signed and Sealed this  
Eighth Day of March, 2016

Michelle K. Lee  
*Director of the United States Patent and Trademark Office*